(12) United States Patent
Parison et al.

(10) Patent No.: US 7,202,577 B2
(45) Date of Patent: Apr. 10, 2007

(54) SELF-COOLING ACTUATOR

(75) Inventors: James A. Parison, New Ipswich, NH (US); John J. Breen, Southboro, MA (US)

(73) Assignee: Bose Corporation, Framingham, MA (US)

( * ) Notice: Subject to any disclaimer, the term of this patent is extended or adjusted under 35 U.S.C. 154(b) by 253 days.

(21) Appl. No.: 10/870,521

(22) Filed: Jun. 17, 2004

(65) Prior Publication Data

US 2005/0280318 A1 Dec. 22, 2005

(51) Int. Cl.
*H02K 41/00* (2006.01)
*H02K 5/00* (2006.01)
*F04B 45/00* (2006.01)
*F16C 39/00* (2006.01)

(52) U.S. Cl. .................. 310/14; 310/89; 92/140; 417/413.1

(58) Field of Classification Search .................. 310/58, 310/60 R, 62–63, 89, 90.5; 92/140, 162 R, 92/165 R, 166; 417/413.1, 417
See application file for complete search history.

(56) References Cited

U.S. PATENT DOCUMENTS

| 3,805,099 | A | * | 4/1974 | Kelly | 310/12 |
| 4,406,959 | A | * | 9/1983 | Harano et al. | 310/58 |
| 4,889,039 | A | * | 12/1989 | Miller | 92/140 |
| 5,246,353 | A | * | 9/1993 | Sohn | 417/413.1 |
| 5,573,088 | A | | 11/1996 | Daniels | |
| 5,714,816 | A | * | 2/1998 | Jensen et al. | 310/89 |
| 6,111,375 | A | * | 8/2000 | Zenobi | 318/376 |

FOREIGN PATENT DOCUMENTS

| DE | 102 05 771 A1 | 2/2002 |
| EP | 0 604 028 A1 | 11/1993 |
| JP | 04159113 | 2/1992 |

* cited by examiner

*Primary Examiner*—Tran Nguyen
(74) *Attorney, Agent, or Firm*—Fish & Richardson P.C.

(57) ABSTRACT

An actuator for an active suspension system includes an armature and a housing enclosing an interior. The interior has a volume that varies in response to movement of the armature. A wall of the housing forms a first aperture through which air passes in response to movement of the armature.

23 Claims, 2 Drawing Sheets

SELF-COOLING ACTUATOR

TECHNICAL FIELD

The description relates to active suspension systems.

BACKGROUND

Active suspension systems for motor vehicles typically include actuators coupled to the wheels of the vehicle. In response to instructions from a controller, these actuators control the attitude of the motor vehicle's body.

One type of actuator is an electromagnetic actuator in which current through a coil generates a magnetic field that causes movement of an armature coupled to the wheels. This coil current is provided by power electronic circuits. The currents in both the coil and the circuits generate heat.

Because of the harsh environment in which they operate, the components of the actuator, including the power electronic circuits, are enclosed in a protective housing. Because the power electronics are confined in a small enclosed space, the need to dissipate heat becomes more significant.

SUMMARY

An aspect of the invention is an actuator for an active suspension system. The actuator includes an armature and a housing enclosing the armature. The housing has an interior volume that varies in response to movement of the armature. In response to movement of the armature, air passes through a first aperture defined by the housing.

In one embodiment, the housing also defines a second aperture through which air moves in response to movement of the armature. In response to movement of the armature, air is either drawn into the interior through the first and second apertures or expelled from the interior through the first and second apertures. Alternatively, in response to movements of the armature, air is drawn into the housing through the first aperture and expelled through the second aperture.

In other embodiments, electronic circuitry for effecting movement of the armature is disposed within the interior of the housing.

Other embodiments include those in which the housing defines a labyrinth extending between the first and second apertures. An optional filter is placed in the labyrinth thus formed.

Optional first and second one-way valves can be disposed to allow admission of air into the housing interior through the first aperture and expulsion of air from the housing interior through the second aperture. The second one-way valve can also be disposed to allow expulsion of water from the housing interior through the second aperture.

In other embodiments, the housing includes a first portion coupled to the armature; and a second portion coupled to the first portion. The first portion can include a flexible portion joined to the second portion. The first portion can, for example, include bellows. Other embodiments include those in which the first portion of the housing includes a moveable portion, and those in which the second portion is a rigid portion.

The first portion can include a first cylinder and the second portion can include a second cylinder. In this case, the first and second cylinder have different radii so that one of the first and second cylinders can slide into the other in response to movement of the armature. Or, the first portion can include a piston head and the second portion can include a cylinder sized to accommodate the piston head. The piston head and the cylinder together define a volume that changes in response to movement of the armature.

In other embodiments, the first portion defines a second aperture through which air moves in response to movement of the armature.

In other embodiments, the second portion defines both a second aperture through which air moves in response to movement of the armature and a first aperture. The second portion can optionally define a labyrinth between the first and second apertures.

Other embodiments of the invention include those in which a first one-way valve is disposed to allow admission of air into the housing interior through the first aperture. A second one-way valve can then be disposed to allow expulsion of air from the housing interior through the second aperture.

In another aspect, the invention includes a method for cooling components of an actuator in an active suspension system by enclosing the components in a housing having an interior volume. The interior volume is then increased. This draws air into the interior volume and passes it over the components of the actuator. Then, the interior volume is decreased to expel air from the housing.

In some embodiments of the invention, increasing the interior volume includes causing air to be drawn into the housing through a first aperture. Decreasing the interior volume includes causing air to be expelled from the housing through the first aperture.

In other embodiments of the invention, increasing the interior volume includes causing air to be drawn into the housing through a first aperture. Decreasing the interior volume includes causing air to be expelled from the housing through a second aperture. One way to cause air to be drawn into the aperture is to cause a first one-way valve sealing the first aperture to open. The expulsion of air from the housing can then include causing the opening of a second one-way valve that seals the second aperture.

Other embodiments of the invention include those in which water is expelled from the housing through the second aperture by decreasing the interior volume of the housing.

In other embodiments of the invention, changing the interior volume, either by increasing or decreasing it, can include passing current through a coil in the housing. The actuator in this case has a moveable armature coupled to a flexible portion of the housing.

DETAILED DESCRIPTION

An adaptive suspension system for a motor vehicle includes four electromagnetic actuators 10 mounted in each of the four corners of the motor vehicle. In response to signals from a controller, the actuators 10 apply forces to dynamically control the separation between a vehicle chassis and the road surface. These forces collectively control the attitude of the chassis relative to the road surface.

Figure 1:
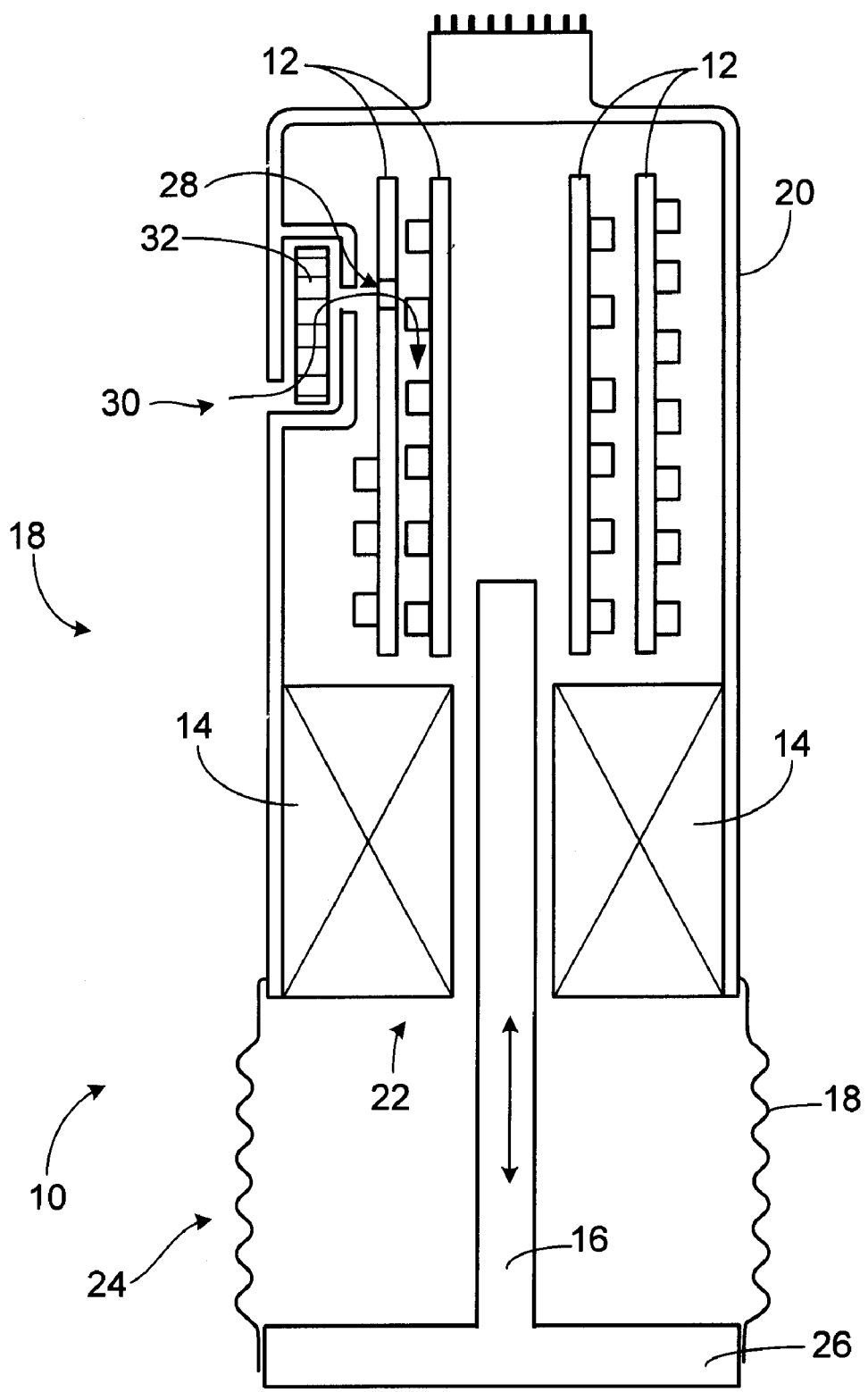
FIG. 1 shows an actuator in which air enters and exits the housing through the same aperture.

An exemplary actuator 10, which is shown in FIG. 1, converts electrical energy into mechanical energy in response to a signal provided by a controller (not shown). This signal is received by components mounted on circuit boards 12 contained within the actuator 10. In response to the control signal, components on the circuit boards 12 cooperate to generate a current through coils 14 that are disposed to magnetically couple to a magnetic armature 16. The coils 14 may be further surrounded by ferrous materials such as steel. This current causes the armature 16 to move along a longitudinal axis of the coils 14. The controller may be inside or outside the enclosure. A suitable actuator 10 is that disclosed in U.S. Pat. No. 4,981,309, the contents of which are incorporated herein by reference.

The illustrated actuator 10 is intended to operate in an environment laden with dust, moisture, pieces of flying gravel, and occasional animal parts. To enable reliable operation in such a harsh environment, the actuator 10 is provided with a protective housing 18 that encloses the circuit boards 12, the coils 14, and the armature 16.

An upper portion 20 of the housing 18 forms a rigid bell that protects the circuit boards 12 and the coils 14. The bell has an opening 22 that is attached to a flexible lower portion 24 of the housing 18. A stop plate 26 integrated with the armature 16 is coupled to one end of the flexible lower portion 24. The upper and lower portions 20, 24 together form a generally tubular structure. The lower portion 24 of the housing 18 is axially flexible. In the illustrated embodiment, the lower portion 24 includes bellows that expand and contract in response to axial movement of the armature 16.

As a result of ohmic losses, the current flowing in the coils 14 and in the various electronic components on the circuit boards 12 generate heat. Because these heat-generating elements are enclosed in the housing 18, the temperature within the housing 18 may rise to levels that might cause premature failure of components.

As the armature 16 moves downward, in an intake stroke, the bellows expand and draw cool air through an inner aperture 28 and an outer aperture 30 separated by a labyrinth occupied by a filter 32. Preferably, the inner aperture 28 is adjacent to the circuit boards 12, so that the cool filtered air passes immediately over the circuit boards 12. As the armature 16 moves upward, in an exhaust stroke, the bellows contract, forcing warm air out though the inner and outer apertures 28, 30.

As shown in FIG. 1, the outer aperture 30 is below the inner aperture 28. This relationship enables any water that enters or condenses within the labyrinth to drip outward, away from the housing 18.

In the embodiment shown in FIG. 1, air enters and exits the housing 18 through the same apertures 28, 30. This configuration has disadvantages. First, any moisture in the incoming air may condense inside the housing 18. When it does so, it will tend to collect on the stop plate 26. Second, during the exhaust stroke, the bellows blow across the circuit boards 12, air that has already passed over the circuit boards 12 at least once. Such air will generally be warmer than the air drawn in from the outside during the intake stroke. As a result, the average temperature of air passing over the circuit boards 12 is higher than it would be if only fresh outside air passed over the circuit boards 12. These disadvantages are overcome in the embodiment shown in FIGS. 2 and 3, in which air enters and exits the housing 18 through different apertures.

Figure 2:
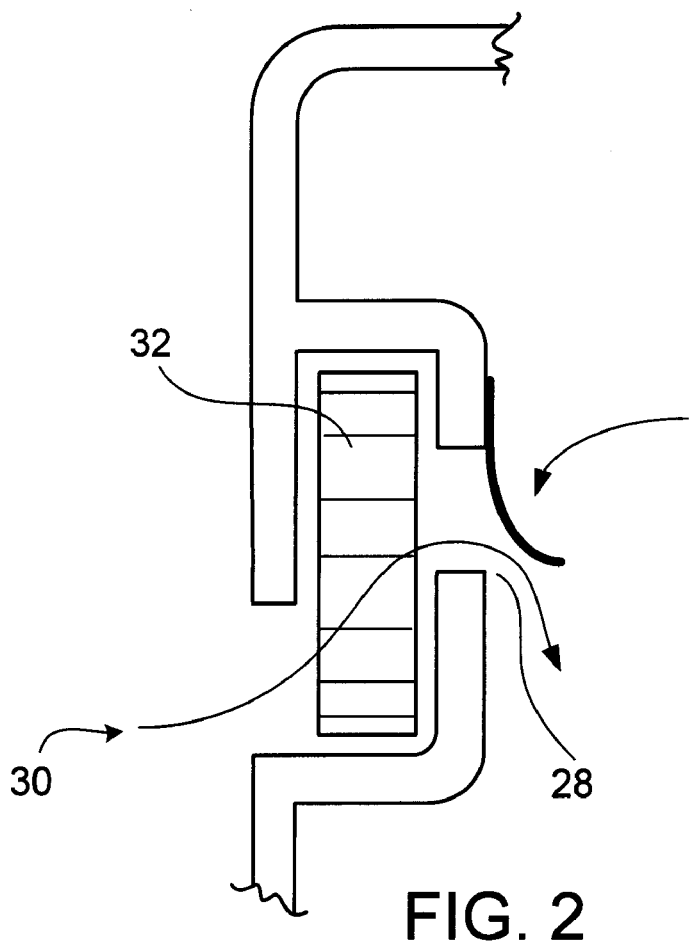
FIG. 2 shows a one-way valve sealing an intake aperture.

FIG. 2 shows an inner aperture 28 that is sealed by an intake valve 34. The intake valve 34 is a one-way flap or check valve that is oriented to allow outside air to enter the housing 18 but to prevent air from exiting the housing 18. Conversely, an exhaust aperture in the stop plate 26 is sealed by an exhaust valve, shown in FIG. 3. The exhaust valve, like the intake valve 34, is a one-way flap, or check valve. However, its orientation is such that air is permitted to exit, but not to enter, the housing 18. The placement of the exhaust aperture at the stop plate 26 is advantageous because the stop plate 26 is at the lowest point on the actuator 10. As a result, gravity causes any accumulated moisture to collect on the stop palate 26 and to drain out of the housing 18 through the exhaust aperture. However, the exhaust aperture need not be at the actuator's lowest point.

Alternatively, the housing 18, can be formed by having the armature 16 and the stop plate 26 function as a piston arm and piston head respectively. The stop plate 26 would then fit snugly inside a cylinder. In this case, the interior volume of the housing, which is defined by walls of the cylinder and the stop plate, again changes volume in response to movement of the armature 16.

Figure 3:
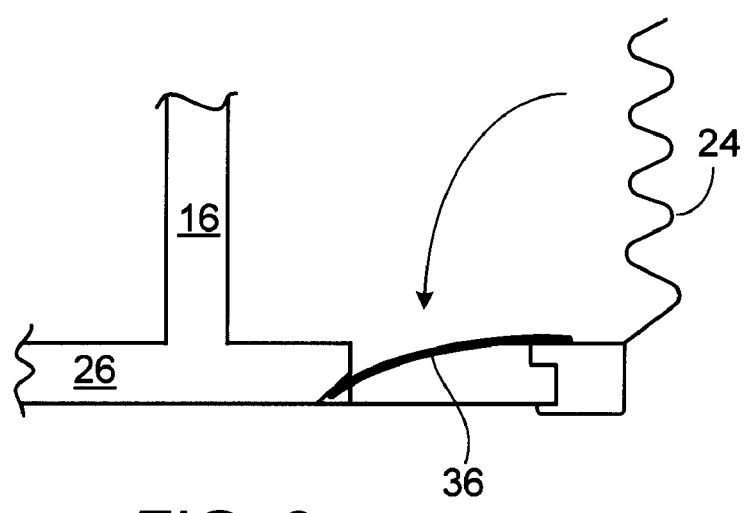
FIG. 3 shows a one-way valve sealing an exhaust aperture.

In a housing 18 having an intake valve 34 and an exhaust valve 36 as shown in FIGS. 2 and 3, the intake stroke draws air into the housing 18 and across the circuit boards 12, as discussed in connection with FIG. 1. However, during the exhaust stroke, air exits the housing 18 through the exhaust aperture.

The configuration shown in FIGS. 2 and 3, in which air enters and exits the housing 18 through different apertures, offers at least two advantages. First the average air temperature at the circuit boards 12 will be lower. As a result, the air will cool the circuit boards 12 more effectively. Second any water condensing inside the housing 18 will be able to exit the housing 18 through the exhaust aperture. This expulsion will occur automatically during the exhaust stroke, as the exhaust valve 36 opens.

In the embodiments described herein, the interior volume of the housing 18 changes because bellows expand and contract in response to movement of the armature 16. However, other structures can be used to change the volume of the housing. For example, the armature 16 may be coupled to a first rigid cylinder that slides into and out of a second rigid cylinder. In this case, the volume enclosed by the first and second cylinders would also change in response to movement of the armature.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

We claim:

1. An actuator for an active suspension system, the actuator comprising:

an armature; and a housing enclosing the armature, the housing having an interior space, the volume of which varies in response to movement of the armature, the housing defining a first aperture through which air passes in response to movement of the armature;

wherein the housing comprises a first portion coupled to the armature; and a second portion coupled to the first portion, wherein a volume enclosed by the first and second portions varies in response to movement of the armature, wherein the second portion defines a second aperture through which air passes in response to movement of the armature, and defines the first aperture, and wherein the second portion defines a labyrinth between the first and second apertures.

2. A motor vehicle having an active suspension system, the active suspension system including an actuator, the actuator having
an armature; and
a housing enclosing the armature, the housing having an interior space, the volume of which varies in response to movement of the armature, the housing defining a first aperture through which air passes in response to movement of the armature,
wherein the housing further defines
a wall forming a second aperture through which air passes in response to movement of the armature, and
walls defining a labyrinth extending between the first and second apertures.

3. An active suspension system comprising an actuator having
an armature; and
a housing enclosing the armature, the housing having an interior space, the volume of which varies in response to movement of the armature, the housing defining a first aperture through which air passes in response to movement of the armature,
wherein the housing further defines
a wall forming a second aperture through which air passes in response to movement of the armature, and
walls defining a labyrinth extending between the first and second apertures.

4. A motor vehicle comprising an active suspension system having an actuator; the actuator having
an armature; and
a housing enclosing the armature, the housing having an interior space, the volume of which varies in response to movement of the armature, the housing defining a first aperture through which air passes in response to movement of the armature,
wherein the housing further defines
a wall forming a second aperture through which air passes in response to movement of the armature; and
walls defining a labyrinth extending between the first and second apertures.

5. An actuator for an active suspension system, the actuator comprising:
an armature; and
a housing enclosing the armature, the housing having an interior space, the volume of which varies in response to movement of the armature, the housing defining a first aperture through which air passes in response to movement of the armature,
wherein the housing further comprises, a first portion coupled to the armature; and a second portion coupled to the first portion,
wherein a volume enclosed by the first and second portions varies in response to movement of the armature, and
wherein the first portion comprises a moveable portion, and
wherein the a first cylinder and the second portion comprises a second cylinder, the first and second cylinder having different radii such that one of the first and second cylinders can slide into the other in response to movement of the armature.

6. The actuator of claim 5, wherein the first portion comprises bellows.

7. The actuator of claim 6, wherein the first portion further comprises a stop plate configured to move in response to movement of the armature, whereby the stop plate couples the first portion to the armature.

8. The actuator of claim 7, wherein the stop plate defines a second aperture through which air passes in response to movement of the armature.

9. The actuator of claim 6, wherein the armature comprises a stop plate coupled to the bellows.

10. The actuator of claim 9, wherein the stop plate defines a second aperture through which air passes in response to movement of the armature.

11. The actuator of claim 10, further comprising a
a first one-way valve associated with the first aperture, the first one-way valve being configured to allow admission of air into the housing interior through the first aperture; and
a second one-way valve associated with the second aperture, the second one-way valve being configured to allow expulsion of air from the housing interior through the second aperture.

12. The actuator of claim 5, further comprising a stop plate defining a second aperture, the stop plate being coupled to the bellows.

13. The actuator of claim 5, wherein the first portion comprises a flexible portion joined to the second portion.

14. The actuator of claim 5, wherein the second portion comprises a rigid portion.

15. The actuator of claim 5, wherein the first portion comprises a piston head and the second portion comprises a cylinder sized to accommodate the piston head, the piston head and the cylinder defining a volume that changes in response to movement of the armature.

16. The actuator of claim 5,
wherein the first portion defines a second aperture through which air passes in response to movement of the armature, the actuator further comprising
a first one-way valve associated with the first aperture, the first one-way valve being configured to allow admission of air into the housing interior through the first aperture; and
a second one-way valve associated with the second aperture, the second one-way valve being configured to allow expulsion of air from the housing interior through the second aperture.

17. An actuator for an active suspension system, the actuator comprising:
an armature; and
a housing enclosing the armature, the housing having an interior space, the volume of which varies in response to movement of the armature, the housing defining a first aperture through which air passes in response to movement of the armature,
wherein the housing further defines
a wall forming a second aperture through which air passes in response to movement of the armature, and
walls defining a labyrinth extending between the first and second apertures.

18. The actuator of claim 17, further comprising electronic circuitry for effecting movement of the armature, the electronic circuitry disposed within the interior volume of the housing.

19. The actuator of claim 17, further comprising a filter disposed in the labyrinth.

20. The actuator of claim 17, further comprising:
a first one-way valve associated with the first aperture, the first one-way valve being configured to allow admission of air into the housing interior through the first aperture.

21. The actuator of claim 20, further comprising:
a second one-way valve associated with the second aperture, the second one-way valve being configured to allow expulsion of air from the housing interior through the second aperture.

22. The actuator of claim 21, wherein the second one-way valve is disposed to drain fluid from the interior volume of the housing.

23. The actuator of claim 17, wherein the first and second apertures are configured such that, in response to a first movement of the armature, air is drawn into the interior through the first aperture, and in response to a second movement of the armature, air is expelled from the interior through the second aperture.

* * * * *